United States Patent [19]
Ishihara et al.

[11] Patent Number: 5,171,588
[45] Date of Patent: Dec. 15, 1992

[54] METHOD FOR MODULATING THE SEDIMENTATION RATE OF PISCICULTURAL DRY PELLETS AND PRODUCT THEREOF

[75] Inventors: Kazuhiko Ishihara, Shiga; Jun Kawaguchi, Osaka, both of Japan

[73] Assignee: Dai-Ichi Kogyo Seiyaku Co., Ltd., Kyoto, Japan

[21] Appl. No.: 699,086

[22] Filed: May 13, 1991

[30] Foreign Application Priority Data

May 21, 1990 [JP] Japan .................................. 2-131521

[51] Int. Cl.$^5$ .............................................. A23L 1/326
[52] U.S. Cl. ............................................ 426/1; 426/2; 426/643; 426/805
[58] Field of Search ...................... 426/1, 643, 805, 2

[56] References Cited

U.S. PATENT DOCUMENTS

| | | | |
|---|---|---|---|
| 2,904,436 | 9/1959 | Averbach | 426/805 X |
| 4,239,782 | 12/1980 | Cinquemani | 426/2 |
| 4,863,754 | 9/1989 | Ibuki et al. | 426/643 |

FOREIGN PATENT DOCUMENTS

| | | | |
|---|---|---|---|
| 3306027 | 8/1984 | Fed. Rep. of Germany | 426/805 |
| 57-138346 | 8/1982 | Japan | 426/1 |
| 58-183045 | 10/1983 | Japan | 426/643 |
| 61-260841 | 11/1986 | Japan | 426/643 |
| 62-143648 | 6/1987 | Japan | 426/805 |
| 62-143649 | 6/1987 | Japan | 426/805 |

OTHER PUBLICATIONS

Formo et al, *Bailey's Industrial Oil and Fat Products,* vol. 1, 4th ed., 1980, pp. 596–597, Gp 130.

*Primary Examiner*—Arthur L. Corbin
*Attorney, Agent, or Firm*—Jordan and Hamburg

[57] ABSTRACT

The invention relates to a method for modulating the sedimentation rate of piscicultural dry pellets and to piscicultural dry pellets with a controlled sedimentation rate. The invention is characterized in that a defined surfactant is added to a piscicultural dry pellet material. In accordance with the invention, it is easy to modulate the floatation property or sedimentation rate of piscicultural dry pellets which has heretofore been difficult to control.

12 Claims, No Drawings

METHOD FOR MODULATING THE SEDIMENTATION RATE OF PISCICULTURAL DRY PELLETS AND PRODUCT THEREOF

BACKGROUND OF THE INVENTION

The present invention relates to a method for modulating the sedimentation rate of dry pellets which are used as fish feed and to piscicultural dry pellets with controlled desimentation rates.

As feeds for the culture of various seawater fishes such as yellowtail, sea bream, salmon, bastard halibut, striped jack, etc., freshwater fishes such as carp, trout, ayu or sweetfish, eel, landlocked salmon, tilapia, catfish, etc., and crustaceans such as kuruma prawn, black or jumbo shrimp, etc., there have been used live feeds such as sardine, horse and various mackerels, etc., moist pellets (Oregone moist pellets) prepared by granulating live feed-mash mixtures, and dry pellets prepared by a process of extruding a feed material based on fishmeal, gluten and starch.

Of these feeds, live feeds have the disadvantage that when they are minced and cast, the fishing grounds tend to be soiled. Moist pellets are very satisfactory feeds but since these are prepared by kneading a live feed with a mash and granulating the kneaded mixture, the production thereof requires a large-scale plant including a freezing plant, granulating machinery and so on, thus being procedure-wise complicated and time-consuming.

Therefore, dry pellets which are free from these disadvantages and amenable to automatic feeding have for some time been polularized. While some dry pellets do not contain oils or fats as ingredients positively added, recently oil-rich high-energy dry pellets containing 10 to 50 weight percent of oil and/or fat are attracting attention from the standpoint of improving the body weight gain of fish and the feed efficiency.

These dry pellets are generally manufactured by means of a single-screw or twin-screw extruding machine on the principle that the water, heat and pressure applied cause the starch component of the feed to swell as it is discharged from the extruder into the atmosphere.

The dry pellets thus manufactured are sometimes called expanded pellets (briefly, EP) in recognition of the above production mechanism and as the name implies, are low in specific gravity and, hence, float on the water after scattering. As may also be conjectured from the above mechanism involved, the higher the starch content or the higher the heat and pressure within the extruder, the greater is the tendency of pellets to swell.

With regard to the oil component, it is contributed, at least in part, by the main ingredient fishmeal but an oil or fat is sometimes added positively and the degree of expansion decreases with an increasing amount of the oil added. Thus, when the oil component is high, the degree of expansion is sacrificed and the pellets gain in specific gravity and tend to sink. To insure a sufficient degree of expansion, it has been attempted to increase the proportion of starch and/or intensify the heat and pressure conditions. However, this line of approach may beckon such objectionable outcomes as an excessively increased proportion of starch which is low in feed efficiency (because carnivorous fish do not digest starch well) and destruction of vitamins which are either inherent in the fishmeal or added positively.

On the other hand, the relationship between fish and the buoyancy or sedimentation property of feed pellets cannot be defined in universal terms. By way of illustration, young yellowtail, sea bream and other fishes demand relatively small-sized floating pellets in their youth but, as they grow, come to favor large-sized, sinking pellets and are even more fastidious in their choice according to seasons, favoring slowly sinking pellets in one season and more or less fast sinking pellets in another. Freshwater fishes, such as carp, trout and so on generally favor floating pellets, while crustaceans such as prawn and shrimp generally hunger for sinking pellets.

It might be possible, though to a limited extent, to meet such diversified demands by modifying the specific gravity and, hence, sedimentation rate of pellets through control of the quality and quantity of fishmeal and starch, the level of addition of oil/fat, the quantity of water added, and the extruder operating conditions such as granulation heat and pressure. However, many of these materials and operating conditions are narrow in the latitude of control and/or demand complicated procedures for control.

Thus, the conventional pellet manufacturing technology is not flexible enough in the control of the buoyancy or sedimentation rate of pellets.

SUMMARY OF THE INVENTION

The object of the present invention is to provide a method for controlling the buoyancy or sedimentation rate of dry pellets in a delicate manner and to provide dry pellets with modulated sedimentation rates.

One of the methods for modulating the pellet sedimentation rate in accordance with the present invention is characterized in that the sedimentation rate of dry pellets is increased by adding to a piscicultural dry pellet material at least one surfactant selected from the group consisting of sucrose fatty acid esters, polyoxyethylene-sorbitan fatty acid esters, polyglycerol fatty acid esters and polyoxyethylene-glycerol fatty acid esters and having an HLB (hydrophile-lipophile balance) number of not less than 12.

When such a surfactant is employed, the dry pellets are rapidly soaked with water and, hence, the air cells in the pellets are readily driven out to increase the sedimentation rate of the pellets.

Another method for modulating the sedimentation rate of dry pellets in accordance with the present invention is characterized in that the sedimentation rate of dry pellets is decreased, or the buoyancy of the pellets is increased, by adding to a piscicultural dry pellet material at least one surfactant selected from the group consisting of sucrose fatty acid esters, sorbitan fatty acid esters, glycerol fatty acid esters, polyglycerol fatty acid esters and lecithin and having an HLB number of not more than 8.

When such a surfactant is employed, the penetration of water into the dry pellets is retarded and, hence, the air in the pellets is only slowly evacuated to delay settling of the pellets.

DETAILED DESCRIPTION OF THE PREFERRED EMBODIMENTS

The raw materials for the piscicultural dry pellets of present invention are those which are conventionally employed, viz. various proteinaceous materials such as fishmeal, meat flour, skim milk, krill meal, cuttlefish meal, etc.; vegetable materials such as vegetable oil cakes, cereal flours, starch, gluten meal, etc., vitamins, minerals, and oils and fats such as cod liver oil, Alaska pollack [Theragra chalcogrammus (Pallas)] liver oil, sardine oil, beef tallow, lard, soybean oil and cottonseed oil and the corresponding hydrogenated oils.

The fatty acid moiety of the sucrose fatty acid ester which may be employed in accordance with the present invention is a fatty acid of 8 to 22 carbon atoms and preferably of 12 to 18 carbon atoms. Such fatty acids may be either saturated or unsaturated. The HLB number of the sucrose fatty acid ester is not more than 8 or not less than 12.

The polyol moiety of the sorbitan fatty acid ester to be employed in the present invention includes not only sorbitan as such but also a dehydration product of sorbitol, such as sorbide. The fatty acid moiety of the sorbitan fatty acid ester is a fatty acid containing 8 to 22 carbon atoms, preferably 12 to 18 carbon atoms. Such fatty acids may be saturated or unsaturated. The degree of esterification of sorbitan by such fatty acid may range from 1 to 4 and preferably 1 to 2. The HLB number of such sorbitan fatty acid ester may range from 3 to 8.

The polyoxyethylene-sorbitan fatty acid ester which may be employed in the present invention is an addition reaction product of ethylene oxide and a sorbitan fatty acid ester and this sorbitan fatty acid ester can be any of those described above. The number of moles of ethylene oxide constituting the adduct may range from 1 to 100, preferably 5 to 30, per mole of sorbitan fatty acid ester. The HLB number of such polyoxyethylene-sorbitan fatty acid ester may range from 12 to 19.

The glycerol fatty acid ester or polyglycerol fatty acid ester which may be employed in the present invention is an ester of a fatty acid and either glycerol or polyglycerol or a derivative thereof. Thus, for example, mono- and diglycerides, acetic and fatty acid esters of glycerol, lactic and fatty acid esters of glycerol, citric and fatty acid esters of glycerol, succinylated monoglycerides, diacetyltartaric and fatty acid esters of glycerol, acetic acid esters of glycerol, polyglycerol esters of fatty acids and polyglycerol esters of interesterified ricinoleic acid, etc. may be mentioned. The fatty acid moieties of these esters may be those containing 8 to 22 carbon atoms, as well as polycondensed ricinoleic acid. The HLB number of such ester may range from 2 to 8 in the case of glycerol fatty acid esters and derivatives thereof, and from 1 to 8, or from 12 to 17, in the case of polyglycerol fatty acid esters and derivatives thereof.

The polyoxyethylene-glycerol fatty acid ester which may be employed in accordance with the present invention is an addition reaction product between ethylene oxide and said glycerol fatty acid ester. The number of moles of ethylene oxide added to each mole of glycerol fatty acid ester may range from 1 to 100 and preferably from 5 to 30. The HLB number of such polyoxyethylene-glycerol fatty acid ester may range from 12 to 19.

Lecithin, which can also be used in the present invention, is a phospholipid available from soybean, egg yolk or the like, which is actually a mixture of phosphatidyl choline, phosphatidyl ethanolamine, phosphatidyl inositol and so on. Likewise, high-purity lecithin obtainable by fractional purification of such phospholipid mixture, enzyme-degraded lecithin, modified lecithin, etc. can also be employed. The HLB number of such lecithin may range from 3 to 8.

In the practice of the present invention, at least one of the surfactants mentioned above is added to a piscicultural dry pellet material at a final concentration of 0.1 to 5 percent (weight %; the same applies hereinafter) based on product dry pellets. If the amount of the surfactant is less than 0.1%, the sedimentation modulating effect attainable will not be sufficient, while the use of the surfactant in excess of 5% is economically unwarranted.

The dry pellets of the present invention can be manufactured in an optional manner, for example by feeding a single-screw or twin-screw extruder with fishmeal, starch, vitamins, minerals, oil/fat, water, etc., as well as the aforesaid surfactant, and drying the resulting granules. As an alternative, a disk pelleter may be used for granulation. There is, however, no limitation on methods for manufacture that can be employed. The method for addition of the surfactant is also optional. Thus, the surfactant may be directly mixed into the powdery pellet material or dissolved or dispersed in water or oil and added as such.

The water content of the finished dry pellets is not more than 12 percent.

The floatation tendency or sedimentation rate of the dry pellets is primarily dependent on extrusiongranulating conditions. For example, increasing the proportion of starch or the granulating temperature tends to yield pellets which float on water. As to the oil or oleaginous component, although the floatation tendency or sedimentation rate depend on other conditions as well, an oil content of less than 25% tends to cause the pellets to float, while pellets with an oil content of more than 25 percent tend to sink.

By adding at least one of said surfactants to such a dry pellet material, it is made possible to easily control the floatation tendency or sedimentation rate of dry pellets. To be specific, the HLB number of the surfactant (the weighted average HLB number of two or more surfactants) is a determinant factor in said floatation tendency or sedimentation rate.

Thus, dry pellets which would otherwise sink soon in the absence of the surfactant can be freely modulated in sedimentation rate by adding at least one surfactant selected from the group consisting of sucrose fatty acid esters, sorbitan fatty acid esters, glycerol fatty acid esters, polyglycerol fatty acid esters and lecithin and having an HLB number of not more than 8 and can even be caused to float by selecting such a surfactant with a very low HLB number or raising the level of addition of the surfactant.

Conversely, even dry pellets which would otherwise float thoroughly in the absence of the surfactant can be caused to sink by adding a surfactant selected from the group consisting of sucrose fatty acid esters, polyoxyethylene-sorbitan fatty acid esters, polyglycerol fatty acid esters and polyoxyethylene-glycerol fatty acid esters and having an HLB number of not less than 12 and the sedimentation rate can be further increased by increasing the HLB number. This effect is augmented as the level of addition of the surfactant is enhanced.

In the present invention, the oil content of dry pellets can be adjusted over a broad range with 50% as the upper limit and, therefore, the sedimentation rate can be further modulated by this adjustment as well.

The present invention thus facilitates the modulation of the floatation tendency or sedimentation rate of piscicultural dry pellets which has heretofore been difficult to achieve so that the industry may easily respond to varying demands according to the species and age of fish, seasons and other variables.

The following examples and comparative examples are intended to illustrate the present invention in further detail and should by no means be construed as defining the metes and bounds of the invention.

EXAMPLES 1-20 AND COMPARATIVE EXAMPLES 1-2

Dry pellets were manufactured according to the formulations of Tables 1 and 2 using the procedures set forth below. In the tables, all parts are by weight.

Extruder: Alpharizer® Model α-70 twin-screw extruder (Suehiro Iron Works, Ltd.)
Barrel temperature: 100°-130° C.
Screw speed: 120 rpm.

Each material powder was fed to the extruder via the screw feeder. Water and oil were fed to the barrel with constant-rate pumps.

As a rule, the surfactants were respectively dissolved or dispersed in water and added as such. However, those which were hardly dispersible in water, such as lecithin, were mixed with a liquid oil and added.

The pellets extruded were dried and used as test samples.

The test pellets were evaluated for two items, viz. sedimentation time and % floatation, as set forth below. The results are shown in Table 3.

(1) Sedimentation time: Fifty pieces of each pellet sample were cast in artificial seawater and the time in which the pellets sank by 1 meter was measured. The mean value was taken as the sedimentation time of the sample.

(2) % Floatation: In the above measurement of sedimentation time, the individual pellets which did not sink at all within 120 seconds after scattering over artificial seawater were counted and their percentage was recorded as % floatation.

TABLE 1

| | Example 1 | | Example 2 | | Example 3 | | Example 4 | |
|---|---|---|---|---|---|---|---|---|
| Dry pellet material | | | | | | | | |
| Fishmeal | 75 parts | Fishmeal | 75 parts | Fishmeal | 75 parts | Fishmeal | 75 parts | |
| Potato starch | 15 parts | Potato starch | 15 parts | Potato starch | 15 parts | Potato starch | 15 parts | |
| Vitamins | 5 parts | Vitamins | 5 parts | Vitamins | 5 parts | Vitamins | 5 parts | |
| Minerals | 5 parts | Minerals | 5 parts | Minerals | 5 parts | Minerals | 5 parts | |
| Alaska pollack liver oil | 30 parts | Alaska pollack liver oil | 30 parts | Alaska pollack liver oil | 30 parts | Alaska pollack liver oil | 30 parts | |
| Water | 35 parts | Water | 35 parts | Water | 35 parts | Water | 35 parts | |
| Surfactant | | | | | | | | |
| Sucrose fatty acid ester (HLB = 1) | 1 part | Sucrose fatty acid ester (HLB = 1) | 3 parts | Sorbitan monostearate (HLB = 4.7) | 1 part | Sorbitan monostearate (HLB = 4.7) | 3 parts | |
| | Example 5 | | Example 6 | | Example 7 | | Example 8 | |
| Dry pellet material | | | | | | | | |
| Fishmeal | 75 parts | Fishmeal | 75 parts | Fishmeal | 75 parts | Fishmeal | 75 parts | |
| Potato starch | 15 parts | Potato starch | 15 parts | Potato starch | 15 parts | Potato starch | 15 parts | |
| Vitamins | 5 parts | Vitamins | 5 parts | Vitamins | 5 parts | Vitamins | 5 parts | |
| Minerals | 5 parts | Minerals | 5 parts | Minerals | 5 parts | Minerals | 5 parts | |
| Alaska pollack liver oil | 30 parts | Alaska pollack liver oil | 30 parts | Alaska pollack liver oil | 30 parts | Alaska pollack liver oil | 30 parts | |
| Water | 35 parts | Water | 35 parts | Water | 35 parts | Water | 35 parts | |
| Surfactant | | | | | | | | |
| Stearic monoglyceride (HLB = 3.5) | 1 part | Stearic monoglyceride (HLB = 3.5) | 3 parts | Lecithin (HLB = 3.5) | 1 part | Lecithin (HLB = 3.5) | 3 parts | |
| | | | Example 9 | | Example 10 | | Comparative Example 1 | |
| | | Dry pellet material | | | | | | |
| | | Fishmeal | 75 parts | Fishmeal | 75 parts | Fishmeal | 75 parts | |
| | | Potato starch | 15 parts | Potato starch | 15 parts | Potato starch | 15 parts | |
| | | Vitamins | 5 parts | Vitamins | 5 parts | Vitamins | 5 parts | |
| | | Minerals | 5 parts | Minerals | 5 parts | Minerals | 5 parts | |
| | | Alaska pollack liver oil | 30 parts | Alaska pollack liver oil | 30 parts | Alaska pollack liver oil | 30 parts | |
| | | Water | 35 parts | Water | 35 parts | Water | 35 parts | |
| | | Surfactant | | | | | | |
| | | Sorbitan monopalmitate (HLB = 6.5) | 1 part | Sorbitan monopalmitate (HLB = 6.5) | 3 parts | — | | |

TABLE 2

| | Example 11 | | Example 12 | | Example 13 | | Example 14 | |
|---|---|---|---|---|---|---|---|---|
| Dry pellet material | | | | | | | | |
| Fishmeal | 75 parts | Fishmeal | 75 parts | Fishmeal | 75 parts | Fishmeal | 75 parts | |
| α-Tapioca starch | 25 parts | α-Tapioca starch | 25 parts | α-Tapioca starch | 25 parts | α-Tapioca starch | 25 parts | |
| Vitamins | 5 parts | Vitamins | 5 parts | Vitamins | 5 parts | Vitamins | 5 parts | |
| Minerals | 5 parts | Minerals | 5 parts | Minerals | 5 parts | Minerals | 5 parts | |
| Alaska pollack liver oil | 5 parts | Alaska pollack liver oil | 5 parts | Alaska pollack liver oil | 5 parts | Alaska pollack liver oil | 5 parts | |
| Water | 35 parts | Water | 35 parts | Water | 35 parts | Water | 35 parts | |
| Surfactant | | | | | | | | |
| Sucrose fatty acid ester | 1 part | Sucrose fatty acid ester | 3 parts | Polyoxyethylene-sorbitan mono- | 1 part | Polyoxyethylene-sorbitan mono- | 3 parts | |

TABLE 2-continued

| Example 15 | | Example 16 | | Example 17 | | Example 18 | |
|---|---|---|---|---|---|---|---|
| (HLB = 15) | | (HLB = 15) | | stearate (EO: 20 moles. HLB = 15) | | stearate (EO: 20 moles. HLB = 15) | |
| Dry pellet material | | | | | | | |
| Fishmeal | 75 parts | Fishmeal | 75 parts | Fishmeal | 75 parts | Fishmeal | 75 parts |
| α-Tapioca starch | 25 parts | α-Tapioca starch | 25 parts | α-Tapioca starch | 25 parts | α-Tapioca starch | 25 parts |
| Vitamins | 5 parts | Vitamins | 5 parts | Vitamins | 5 parts | Vitamins | 5 parts |
| Minerals | 5 parts | Minerals | 5 parts | Minerals | 5 parts | Minerals | 5 parts |
| Alaska pollack liver oil | 5 parts | Alaska pollack liver oil | 5 parts | Alaska pollack liver oil | 5 parts | Alaska pollack liver oil | 5 parts |
| Water | 35 parts | Water | 35 parts | Water | 35 parts | Water | 35 parts |
| Surfactant | | | | | | | |
| Hexaglycerol monolaurate (HLB = 13) | 1 part | Hexaglycerol monolaurate (HLB = 13) | 3 parts | Polyoxyethylene-glycerol monostearate (EO: 20 moles. HLB = 14) | 1 part | Polyoxyethylene-glycerol monostearate (EO: 20 moles, HLB = 14) | 3 parts |

| | Example 19 | | Example 20 | | Comparative Example 21 | |
|---|---|---|---|---|---|---|
| Dry pellet material | | | | | | |
| Fishmeal | | 75 parts | Fishmeal | 75 parts | Fishmeal | 75 parts |
| α-Tapioca starch | | 25 parts | α-Tapioca starch | 25 parts | α-Tapioca starch | 25 parts |
| Vitamins | | 5 parts | Vitamins | 5 parts | Vitamins | 5 parts |
| Minerals | | 5 parts | Minerals | 5 parts | Minerals | 5 parts |
| Alaska pollack liver oil | | 5 parts | Alaska pollack liver oil | 5 parts | Alaska pollack liver oil | 5 parts |
| Water | | 35 parts | Water | 35 parts | Water | 35 parts |
| Surfactant | | | | | | |
| Sucrose fatty acid ester (HLB = 15) | | 2 parts | Sucrose fatty acid ester (HLB = 15) | 2 parts | — | |
| Polyoxyethylene-sorbitan monostearate (EO: 20 moles. HLB = 15) | | 1 part | Hexaglycerol monolaurate (HLB = 13) | 2 parts | | |

TABLE 3

| | Sedimentation time (sec/m) | % Floatation |
|---|---|---|
| Example 1 | 92.3 | 82 |
| Example 2 | — | 100 |
| Example 3 | 62.7 | 66 |
| Example 4 | 100.4 | 96 |
| Example 5 | 67.3 | 72 |
| Example 6 | — | 100 |
| Example 7 | 91.1 | 80 |
| Example 8 | — | 100 |
| Example 9 | 60.5 | 48 |
| Example 10 | 77.8 | 52 |
| Comparative Example 1 | 13.2 | 0 |
| Example 11 | 52.0 | 10 |
| Example 12 | 8.8 | 0 |
| Example 13 | 41.9 | 4 |
| Example 14 | 8.2 | 0 |
| Example 15 | 60.0 | 14 |
| Example 16 | 13.3 | 0 |
| Example 17 | 42.1 | 4 |
| Example 18 | 8.7 | 0 |
| Example 19 | 7.0 | 0 |
| Example 20 | 7.8 | 0 |
| Comparative Example 2 | — | 100 |

Whereas the dry pellets manufactured according to the formulation of Comparative Example 1 sank soon, the dry pellets of Examples 1 through 10, which contained surfactants with low HLB numbers, either sank only gradually or remained afloat.

On the other hand, whereas the dry pellets manufactured according to the formulation of Comparative Example 2 remained afloat, the dry pellets of Examples 11 through 20, which contained surfactants with high HLB numbers, sank gradually or comparatively rapidly.

What is claimed is:

1. A method for modulating the sedimentation rate of piscicultural dry pellets containing air cells which comprises adding at least one surfactant having an HLB number of not less than 12 selected from the group consisting of sucrose fatty acid esters, polyoxyethylene-sorbitan fatty acid esters, polyglycerol fatty acid esters and polyoxyethylene-glycerol fatty acid esters to a piscicultural dry pellet material to thereby increase the sedimentation rate of the dry pellets in water.

2. A method according to claim 1, in which the surfactant promotes penetration of water into the pellets thereby to promote driving of the air from the pellets when the pellets are deposited in water inhabited by fish for feeding of the fish.

3. A method for modulating the sedimentation rate of piscicultural dry pellets containing air cells which comprises adding at least one surfactant having an HLB number of not more than 8 selected from the group consisting of sucrose fatty acid esters, sorbitan fatty acid esters, glycerol fatty acid esters, polyglycerol fatty acid esters and lecithin to a piscicultural dry pellet material to thereby decrease the sedimentation rate of the dry pellets or float the dry pellets in water.

4. A method according to claim 3, in which the surfactant retards penetration of water into the pellets thereby to retard driving of the air from the pellets when the pellets are deposited in water inhabited by fish for feeding of the fish.

5. A piscicultural dry pellet containing air cells with an increased sedimentation rate in water which comprises a surfactant having an HLB number of not less than 12 selected from the group consisting of sucrose fatty acid esters, polyoxyethylene-sorbitan fatty acid esters, polyglycerol fatty acid esters and polyoxyethylene-glycerol fatty acid esters and a piscicultural dry pellet material.

6. The piscicultural dry pellet of claim 5 wherein the pellet contains 0.1 to 5 weight percent of said surfactant.

7. A piscicultural dry pellet according to claim 6, in which the surfactant promotes penetration of water into the pellet thereby to promote driving of the air from the pellet when the pellet is deposited in water inhabited by fish for feeding of the fish.

8. A piscicultural dry pellet according to claim 5, in which the surfactant promotes penetration of water into the pellet thereby to promote driving of the air from the pellet when the pellet is deposited in water inhabited by fish for feeding of the fish.

9. A piscicultural dry pellet containing air cells with a decreased sedimentation rate in water or adapted to float in water which comprises at least one surfactant having an HLB number of not more than 8 selected from the group consisting of sucrose fatty acid esters, sorbitan fatty acid esters, glycerol fatty acid esters, polyglycerol fatty acid esters and lecithin and a piscicultural dry pellet material.

10. The piscicultural dry pellet of claim 9 wherein the pellet contains 0.1 to 5 weight percent of said surfactant.

11. A piscicultural dry pellet according to claim 10, in which the surfactant retards penetration of water into the pellet thereby to retard driving of the air from the pellet when the pellet is deposited in water inhabited by fish for feeding of the fish.

12. A piscicultral dry pellet according to claim 9, in which the surfactant retards penetration of water into the pellet thereby to retard driving of the air from the pellet when the pellet is deposited in water inhabited by fish for feeding of the fish.

* * * * *